United States Patent
Goldberg et al.

(10) Patent No.: US 6,312,782 B1
(45) Date of Patent: Nov. 6, 2001

(54) DISCREET SHAPED COLORED POLYMERIC OBJECTS IN A TRANSPARENT OR TRANSLUCENT MATRIX

(76) Inventors: Rochelle L. Goldberg; Kenneth M. Goldberg, both of 174 Locksley Rd., P.O. Box 652, Lynnfield, MA (US) 01940

( * ) Notice: Subject to any disclaimer, the term of this patent is extended or adjusted under 35 U.S.C. 154(b) by 0 days.

(21) Appl. No.: 08/215,113

(22) Filed: Jan. 4, 1994

Related U.S. Application Data

(63) Continuation-in-part of application No. 07/670,682, filed on Mar. 18, 1991, now abandoned.

(51) Int. Cl.$^7$ ............... B32B 5/16; C09K 11/02; A43B 13/04
(52) U.S. Cl. ............ 428/67; 12/146 B; 12/146 BR; 36/103; 36/112; 36/137; 36/136; 36/25 R; 36/30 A; 428/147; 428/327; 428/331
(58) Field of Search ............... 428/67, 147, 323, 428/327, 331; 36/103, 112, 137, 136, 25 R, 1, 30 A, 32 R; 12/146 B, 146 BR; 252/301.36

(56) References Cited

U.S. PATENT DOCUMENTS

| | | | |
|---|---|---|---|
| 2,654,971 | * 10/1953 | Harrison | 252/351.36 |
| 2,793,136 | * 5/1957 | Root | 36/25 R |
| 3,565,815 | * 2/1971 | Christy | 252/301.36 |
| 4,347,673 | * 9/1982 | Svetlik | 36/32 R |
| 4,629,583 | * 12/1986 | Goguen | 252/301.35 |
| 4,640,797 | * 2/1987 | Goguen | 252/301.36 |
| 5,330,195 | * 7/1994 | Gulick | 273/213 |
| 5,502,903 | * 4/1996 | Barker | 36/137 |

\* cited by examiner

Primary Examiner—Hoa T. Le

(57) ABSTRACT

A system to manufacture articles of footwear, shoe soles, shoe parts, clothing, or externally visible safety material having enhanced safety and visibility with reflective fluorescent safety particle chips, pieces, and shapes which are embedded, bonded, or mixed then are distributed in a pattern or at random throughout and integral to a bonding material which is a transparent or translucent elastomeric compound by extrusion or injection molding. The elastomers can consist of natural or synthetic rubbers, thermo plastic elastomers, vinyls (by which is meant polyvinylchloride plastics in transparent or translucent forms), plasticized vinyl (by which is meant polyvinylchloride plastics, with plastersizer, in transparent or translucent forms), butyl rubber, styrene butadiene rubber, GSR, urethane and all similar flexible transparent or translucent mediums with the reflective or fluorescent safety particle chips, pieces, and shapes distributed throughout the structure.

A system for the use of extrusion or injection molding equipment where the translucent or transparent polymeric matrix of the extrusion includes within said matrix, dissimilar polymeric pieces with a higher melting point material, having a size of more than 1/32 inch in the smallest dimension and less than 3/8 inch in the largest dimensions which dissimilar higher melting polymeric material pieces soften rather than dispersing and when processed in normal extrusion processing equipment such as screw extruders or injection extruders, creates within said matrix of lower melting translucent or transparent polymer an extruded matrix with shaped parts, lumps or chips of higher melting polymer therein which does not either scour the barrel of the screw injection molding machinery or screw extruders nor block nor create a dam at the screw flights during the processing of said polymeric material.

32 Claims, 5 Drawing Sheets

DISCREET SHAPED COLORED POLYMERIC OBJECTS IN A TRANSPARENT OR TRANSLUCENT MATRIX

This application Ser. No. 08/215,113 is a continuation-in-part of application Ser. No. 07/670,682 filed Mar. 18, 1991, now abandoned.

FIELD OF INVENTION

Structure for shoe soles and footwear comprising fluorescent and reflective safety particle chips, pieces, and shapes, embedded, bonded, or mixed in a pattern or at random within, throughout and integral to the bonding material comprising natural or synthetic rubbers, thermo plastic elastomers, vinyls "(by which is meant polyvinylchloride plastics in transparent or translucent forms)", plasticized vinyl, butyl rubber, styrene butadiene rubber, GSR, urethanes and all similar flexible transparent or translucent mediums with said materials throughout and integral to the structure to the surface and system to make same. The structure maintains its reflective fluorescent capacity despite wear or abrasion and provides the reflective fluorescent capacity throughout its entire structure life.

BACKGROUND AND PRIOR ART

Polymer and elastomer materials are widely used in shoes, decorative and recreational objects. In most cases a transparent or translucent polymer or elastomer is used since the materials are often colored to match fashion needs or to make them more attractive.

An examination of the marketplace reveals that, although there are reflectors and individuals have embedded or bonded metallic foils within the core of a rubber ball, the use of such structures is unknown in areas other than toys. The only applications seen provide reflective light which is limited by the opalescent medium within which it is mixed. Because of the nature of the metallic material this metal foil can create more of a hazard to people and there is no benefit from the reflective qualities as the surface of the ball or other shape is abraded. There is a need for an attention getting addition to plastics and elastomers that do not rely upon reflective light. It would also be an advantage to eliminate metallic particles, or foils from play objects.

There is also a need for an improved visibility in the footwear, shoes, shoe soles, shoe sole extensions, clothes and accessories of children so that night visibility is improved.

There is a further need for a system that has particles that are fluorescent, thereby solving a need to provide safety in clothing, shoes, tires, because of enhancement of incident light return.

SUMMARY OF THE INVENTION

This invention teaches an enhanced safety material where macrosized particles of a flourescent material are embedded in a matrix of polymer that is transparent or translucent. The macrosized particles provide enhanced visibility when excited by electromagnetic radiation. The invention specifically is advantageous for shoe soles where the shaped parts or chips containing fluorescent pigments or dyes within the polymer matrix provide patterns due to the nature of flow of the viscous polymers. The invention is applicable to both thermoset and thermoplastic materials. In thermoplastic materials, the materials may be easily formed if the melting point of the macrosized shaped parts or chips containing fluorescent pigments or dyes is above the processing temperature of the polymer that forms the translucent or transparent matrix.

It is accordingly the general object of the present invention to provide an improved reflective surface in and within such natural or synthetic rubbers, thermo-plastic elastomers, vinyls, plasticized vinyl, butyl rubber, styrene butadiene rubber, GSR, urethanes and similar flexible transparent or translucent mediums with said materials throughout and integral to the structure to the surface where reflectability is a desirable feature.

Another object of the present invention is to provide increased safety for children using rubber or synthetic rubber shoes or apparel.

Another object of the present invention is to provide an inexpensive highly fluorescent reflective structure that will be both decorative but more importantly increase safety factors wherever it is used to enhance the visibility of a person or object wherein a flexible translucent or transparent medium can be used, embodied in, made a part thereof or connected to that would be durable and resistant to natural elements without losing or diminishing its fluorescent reflective capability.

The opalescent material through which are exposed the first layer of reflective fluorescent chips which may be of several size ranges from micro to macro including plastic fluorescent pigmentation which can be placed at random or induced patterning and no matter how it is used provide the enhanced light refractive qualities derived from fluorescence within a protected wear resistant medium.

Another object of the present invention is to provide improved safety by increased visibility within rubber bicycle tires, off-road vehicles and truck mud guards without causing a blinking effect by mirroring substantial red light to the viewer.

This invention provides a material and a system or method for combining materials not now used in industry that improves visibility, is easy to fabricate, and would be popular as a fashion statement. Fluorescence is critical to the invention.

Fluorescence results from the excitement of the fluorescent material by a relatively wide band of radiation and reradiation in the visible band. The use of this material in the particular shapes and in the manner described following provides an increase in the total available visible light resulting in better safety by adding easily visible objects to the attire of children and adults.

The use of fluorescence cures safety flaws common to materials that solely depend on reflective light rather than enhanced fluorescent light. It provides visibility without depending on wet chemical reactions such as the common light sticks or electrical devices. This invention thus eliminates the use of glass ampules or other hard breakable materials. The amount of visible fluoresced light is greater than the amount of visible spectrum light used to excite the fluorescent material, thereby making this structure different than and more effective than a mere reflector. There are many circumstances where such conditions are desirable, as, for example, for safety purposes at night or with limited light source availability.

There is a need for further safety which is achieved by the use of the product or products which are the object of this invention.

There are many needs for safe and visible surfaces. Automobiles are constructed with reflective lenses, runners are urged to wear reflective clothing and bicycles have lights or permanently-affixed plastic reflective shields attached within the spokes to the structure or to the pedals.

In this invention, a system of embedding or bonding reflective fluorescent particles or chips in and within the structure of natural or synthetic rubber materials, thermo plastic elastomers, vinyls, plasticized vinyl, butyl rubber, styrenes butadiene rubber, GSR, urethanes and similar flexible, transparent or translucent mediums with said materials throughout and integral to the structure to the surface is shown that will provide additional reflectability surfaces to shoe soles for walkers and runners. The invention is also applicable to bicycle tires for increased visibility and for any application where it is useful or desirable to have luminescence or reflective ability in a flexible or moldable and pliable surface as are presently used for rubber shoes, sneakers, rubber or synthetic rubber body suits, clothing or strips to be applied to fixed objects that require flexibility to either wrap around or be bonded to a curved or regular surface.

Examination by these inventors has disclosed that reflectors become inefficient when the surface of the reflector unit is broken, scratched, marred or worn and they recognized a need to provide reflectability to increase the visibility of the user. Accordingly, there is a need for higher degrees of reflectability that are not affected by damage to the surface or wear patterns on the surface that result in decreased reflectability. The reflectability of the structure as described within this invention or made by the methods in this invention is not decreased by damage to or wearing away of the surface of the structure and is diminished only when there is destruction of the entire structure within which the reflective fluorescent particles or chips are embedded or bonded.

The primary object of this invention is to provide by combination a unique material which consists of a base material which is translucent or transparent and additives which are mixed into this base material which are chips containing pigments, dyes, and fluorescent chemicals. These provide an additional margin of safety by providing continued surface reflectability without regard to wear or damage and which has the ability to withstand abuses of wear by friction exposure to water and weather and which will maintain its reflective integrity throughout the entire life of the material. By base material we mean any of the transparent or translucent materials such as synthetic rubber, thermoplastic elastomers, vinyls, plasticized vinyl, butyl rubber, styrene butadiene rubber, GSR, urethanes and all similar flexible mediums with said materials throughout and integral to the structure. The base material has added to it discrete chips or molded particles that contain fluorescent materials and the combination of these chips or particles and the relatively clear base materials provides the unique combination.

The exceptionally desirable feature of this combination system invention is that it will provide a significant additional margin of safety to the users of such products with embedded or bonded reflective fluorescent particles or chips as it is believed that the unobtrusive nature of incorporating these reflective fluorescent particles and chips in walking shoes, running shoes, athletic shoes, bicycle tires, or other applications used by people in diminished or low light situations will significantly add to their visibility, thereby providing significant safety to them, other people and property.

It is believed that the novelty of this invention is most readily seen by the large market of fluorescent coatings, paints and materials used on clothing. The introduction of such materials within the garment industry has resulted in a tremendously-accelerated sales market of all clothing that even equates with fluorescent materials. Although the fluorescent material is available and used topically on clothing, the present invention and the system claims described herein are not obvious to those skilled in the industry because the use is considerably different from the dye or printing application of fluorescent materials to fabrics or to the surface of plastic sheeting. No-one has combined the recently available bright colors of available materials as solid shapes and designs within another material. All use to date has been surface applications. The surface applications do not create the long lasting and fashionable objects created by this new product.

The product fills an obvious safety need in today's highly mobile civilization where people of all ages walk extensively for exercise, jog in athletic programs, and participate in all forms of sporting events at any time of the day or night where one embodiment of this invention alone would serve to promote the safety of the user more so than any other product at any time previously made or disclosed for public use. The fact that one aspect of this invention can be used to provide reflective fluorescence in the soles and sides or any part thereof of a shoe is alone sufficient to demonstrate its desirability and its need and were it obvious, in today's unbridled economy where running shoes routinely cost up to $100.00 per pair, the use of such a product would have been claimed and used by the aggressive marketers or manufacturers of such products particularly when the cost of production of the structure disclosed in this patent by the system employed by this inventor would permit the production of this material for less than $1.00 per shoe sole (when purchasing the components in small quantities at full retail price). There is a tremendous possible market advantage that could be touted by anyone using the inventor's materials in their product not for cosmetic reasons but for safety. The varying of the sizes and shapes of the fluorescent particles within the medium could by their flow, either naturally under pressure or by injection molding, create distinct patterns that would be not only artistic but would by the very nature of the patterns further enhance the safety feature of the product. Flow would cause bright and visible shapes or designs, causing cluster fluorescence, outlined fluorescence or symbols, all to the benefit of safety.

This product requires the production of two step blends where a first small shape is made of fluorescent materials and then this is blended into a mix of other polymers or elastomers. Given the low cost of production, the obvious need and the availability of the materials that would become part of this invention there is clearly a need that has not been filled. There is a need and this type structure is not available in the marketplace. The product is inexpensive to create, desirable to have, easy to market and provides the fulfillment of a pressing safety need.

This invention is most clearly described as the system of combining fluorescent reflective safety particles and chips by embedding or bonding them with a pattern or at random within and throughout and integral to the surface of a structure comprising natural or synthetic rubbers, thermo plastic elastomers, vinyls, plasticized vinyl, butyl rubber, styrene butadiene rubber, GSR, urethanes and similar flexible transparent or translucent mediums with said materials throughout and integral to the structure to the surface. One result of an embodiment of this invention provides enhanced visibility as compared to the given visible spectrum by using the wide band of light radiation, visible and non-visible to excite fluorescent material, embedded or bonded either in a pattern or at random integral to or placed near the surface of the flexible transparent or translucent medium structure. The particles are most apparent when used in low light or dark conditions, to provide safety to the user or wearer of the structure. The combination of materials, the particular shapes of the fluorescent chips, have an overall enhancing effect depending upon the desired safety use. For instance, the use of a specific number of particles, say 10 particles of each size and shape of the fluorescent chips, when combined in proportion to the embodied material structure wherein they are embedded or bonded results in a superior safety product. This product cannot compare to a mere reflector. It is different in character and capability.

This invention covers both a process and a product. The two are inseparable since the use and incorporation of macro sized chips into a polymeric matrix requires an understanding of flows of viscous materials and how these flow regimes affect the macro chips as the polymers containing the macro chips of fluorescent materials are converted into products. Flows are discussed, then the processes and how the processes use these flow regimes to form products that are unique in provision of enhanced safety when used for products.

Flow Considerations

Flow of fluids is an important factor in this invention. While the product and process refers to distribution of particulates within a "solid" that is a polymer matrix, the process of making the product involves flow of either heat liquified matrices and/or the mixing of liquids or oligomers and the subsequent chemical reaction of these liquids or oligomers to solids.

Flow basically occurs in a laminar or turbulent form. On a layman basis rapid flow of water from a faucet will represent turbulent flow and pouring ketchup or syrup a laminar flow.

The widely different properties of laminar and turbulent flows require a better definition. The Reynolds number, a dimensionless number that is $$N_{Re} = \frac{D'v\rho}{\mu}$$

provides this definition between laminar and turbulent flows.

$e$ = density $\qquad v$ = average velocity $D$ = nozzle diameter $\quad \mu$ = absolute viscosity

The Two Types of Flow

A $N_{Re}$ of 3500 or more indicates flow within the turbulent range and flows under 2100 are laminar. The polymers herein when melted and the thermoset chemicals as they start to polymerize are in the laminar flow since the viscosity of these materials are expressed in the poise area (1000 milipoise) which forces $N_{Re}$ into the laminar regime.

Turbulent flow is more common. In this flow, there is a mixing across the flow stream—this is usually called plug flow since the rapid cross flow stream velocity vectors cause cross stream flow as well as flow along the pipe. The resulting velocity versus radial distance thus looks like a plug in the pipe when graphed. The cross stream flow exists for all but the smallest layer hugging the wall of the flow pipe.

Laminar flow differs fundamentally from turbulent flow since there is essentially no cross stream flow. The flow in laminar regimes is often called center flow since a specific lamela of flow (a concentric layer) drags the surrounding lamelas along with it. The resulting velocity versus the radial distance graph will look like sidewise stalagtite within the pipe.

The flow is highest at the center of a pipe (or nozzle). This relatively high center flow then drags successive lamela of material along with it until a significant static or near static lamela near the wall of the pipe (or nozzle) exists.

Now looking at the effect of flow regime on contained particulates, the turbulent flow regime is a mixing flow. A particle added to a stream in turbulent flow would be impacted by cross flow as well as axial flow currents within a pipe thus the particle (and each particle) is pushed across and along the pipe. It would thus be mixed into the stream. A plurality of particles would be mixed into a completely homogeneous distribution. The laminar flow regime is a completely different type of flow. Since the lamela drag along the successive layers, the effect on any particle is to be pulled in an axial direction only without radial mixing. There is a further tendency for the slower layers to grip the particle and it will tend to embed in the slower layers. The result is formation of strings of flow (lamela) that are either rich in particle count or depleted by drag of particles. The contrast between rich and depleted materials is often very evident. Avoidance of such patterns is a major factor in production machinery design. Note how, with center flow of laminar flow regimes, the central area of a plunger cavity would flow out and the lamela nearer the cylinder wall would then collapse into the center and become the center flow (along with a portion of the wall lamela as size of the cavity changes). Alternate flows may be rich or depleted in particles as the various lamela become the predominate center flow components. The emission from a nozzle in laminar flow with macrosized particles would thus have a patterned effect which is a factor of particle flow governed distribution within a pipe or flow chamber.

The pattern flow of laminar flows exists in flow along pipes or through short nozzles.

Note that in this discussion the particules are macro rather than microscopic in size. As the size of a particle drops to the size of the polymer molecules, the differentiation of flows decreases and while the flow will be as described, microscopic particles will not be effectively flow separated or differentiated as would the macro scale particles which are experiencing differing shear rates by differing velocity lamela on different sides of the particles.

Terms Used in This Specification

"Government styrenen rubber uses the anachronyms GSR, GS-R or SBR".

Particles, particulates=the polymer with its colored and/or fluorescent pigments or dyes which is in a shape of macro size, over $\frac{1}{32}$nd inch in size and under $\frac{3}{8}$ths inch in size.

Polymer, plastic=the matrix of natural or synthetic rubbers, thermo plastic elastomers, vinyls, plasticized vinyl, butyl rubber, styrene butadiene rubber, GSR, urethanes and similar flexible transparent or translucent mediums holding the macro size particles that are colored and/or fluorescent. This material will typically be transparent, translucent or tinted matrices.

Injection molding=well-known plastic processing method.

Extrusion=another well-known plastic processing method for thermoplastic materials.

Thermoplastic=polymer that is melted to process.

Thermoset=polymer chemically altered to process by heat, catalysts or intermixing of chemicals or oligomers.

Matrix=see polymer.

Patterned Flows Within Thermoplastic Matrices

A unique feature of the invention is that it shows the normal flow lines of plastic processing and takes the negative aspect of flow-lines and makes them visually attractive.

Flow lines are inherent in the injection of a highly viscous fluid through a narrow nozzle into a much larger die cavity using injection molding technology. The viscous fluid is molten polymer, usually processed by the well-known techniques of screw injection or ram injection. Normally the homogeneity of the molten polymer is critical since a uniform color and opacity is a product requirement. The invention counters this normal practice since it requires particulate additions to the molten polymer which retain their color and especially their fluorescent properties within the melt rather than providing for sufficient smearing and mixing to produce a homogeneous melt.

Looking at mechanisms for maintaining particulate integrity in a molten polymer matrix, several methods are anticipated. There are no polymers now that include a variety of shapes within a polymer matrix in injection molding materials. There is a packaging film that utilizes a microscopic platelet of an oxygen impermeable material such as a nylon in a matrix of polyolefin. This microplatelet technology designed to be an invisible gas barrier again differs from the macroparticulate highly visible shapes and particles in the present invention.

One method to make the macro particles embed within a polymer matrix is to add the particles of visible and fluorescent materials to a pre-melted polymer. This can be effected by, in ram injection, adding the particulates to the ram cylinder as it is being filled with polymer pellets prior to the melting. The macro particles of visible and fluorescent material should be a higher melting material so the material will not smear or mix into the lower melting matrix of melted polymer pellets loaded into the ram. With this method, as the polymer pellets mixed with higher melting particulates melt or soften and then are injected with ram pressure through a nozzle into a cavity (the injection mold) the particulates are pushed into the mold along with the melted polymer. Note that there cannot be a filter present in the melt stream and that the particulates must be smaller than the nozzle. The result of such a ram injection is that flow lines, normal to injection molding flows, are highlighted by alignment of the particles within the flow paths into swirls and flows and this form patterns.

Looking at the commoner screw injection machinery and processes, several ways are used to maintain the integrity of the particulates within this process method. The use of a post melting mixing and a use of higher melting particulates in a matrix so that the particulates remain relatively unchanged.

A post-melting mixing method of incorporating can be the addition, through pumped or forced addition, into a space between the tip of a screw injection screw and the nozzle or into the inlet side of a polymer pump delivery system, then adding the melted polymer of the matrix is one method. The added particulates will be mixed within at least a portion of the molten polymer and as the polymer is forcefully injected into the cavity by forward motion of the screws and again shows the patterns typical of flow within a mold.

Further Thermoset Matrices

Thermoset materials are catalyzed or multiple component mixtures that in mixing or as a result of catalysis is polymerized from fluid state into a solid state. In such a system the particulates would be mixed within the forming polymers. The subsequent use of the thermoset materials now requires introduction into a mold or shape. This is typically by pouring or ram injecting into a mold and again flow lines will be evident as patterns of particulates within the matrix.

Within Elastomeric Matrices

The concepts of this invention is also conducive to elastomer processing. Many non-thermoplastic elastomers are compounded (mixed) in roll mill and high shear mixers. These are surface generating mixers which frequently create thin layers which are then cut or twisted layer on layer to create mixing. This invention is also conducive to production of the product by adding the particulates or shapes at the last cut or mix step so the particulates have their surfaces wetted by the elastomer but are not ground or distorted by continued high shear levels.

Since a number of elastomers are basically translucent or, at least non-opaque in their non carbon reinforced forms, the invention with elastomers forms a valuable decorative pattern and/or heightened visibility material for uses such as shoe soles.

There are also a rapidly expanding number of thermoplastic elastomers which handle as described above with thermoplastic injection equipment.

A third rubber material is elastomers which handle like thermoset materials. Silicone rubbers and butyl rubber caulks are examples of these materials that can be used like the description of thermosets above.

General Considerations

It is evident that both thermoplastic and thermoset materials can be made or mixed by many methods. This variety of methods does however produce, in each case, a unique material which is composed of a macrosized particulate with specific properties including visible fluorescence . The normal processing methods also provide a pattern of these macro particles that would emphasize flow lines within a mold.

Modification of Patterns

The above description clearly shows that the pattern is related to flow lines. The pattern produced can thus be affected by modification of the flows.

The flow modification can be effected by a number of well known methods. The shape and direction of injector nozzles and the size of the nozzle can be varied to change the flows within a mold. The location within the mold of the injection point, while hard to change, may be easily altered as tooling is remade or upgraded. Finally deflector elements on a nozzle may be added to deflect flows within a mold. With these many methods of flow variation, a series of different patterns may be developed. All of these differing patterns have in common the basic elements of this invention, colored fluorescent particulates embedded with a matrix of transparent, translucent or tinted polymeric materials.

Shaped Particles

The concept is simple and revolves around the production of particles in specific designer shapes that are in the 1/32nd inch minimum to 3/8 inch maximum dimension from heavily pigmented fluorescent materials. The drawings and embodiments show how to create the system and the structure of the invention described herein. However, it should be noted that the focus of this invention is on the macro sized fluorescence/highly reflective chips and shapes used in combination with various flexible transparent or translucent mediums. The content of the media, not its type creates this unique structure. For example, the combination of the highly reflective fluorescent chips within a flexible transparent or translucent medium used in an injection system would first fill the mold with the medium that surrounds, and bond to the highly reflective fluorescent chips and yet in the normal manufacturing process, the abrading of the surface of the medium of opalescent material result in an enhancement of the reflective fluorescent quality of the material by exposing the first layer that might otherwise obscure or diminish the fluorescent reflective ability of the structure.

The fluorescent types and sizes will vary from the desired use and application from macro to micro, perhaps with the interspersement of some larger chips that would appear to be for decorative purposes but in reality would provide safety. In certain plastics fluorescent pigments can be used, thereby providing an enhanced reflective fluorescence by carefully mixing the amount of plastic particle pigments within the desired flexible transparent or translucent medium. The subject matter of this invention can be succinctly described as structure comprising fluorescent and reflective safety particle chips, pieces, and shapes embedded, bonded, or mixed in a pattern or at random within, throughout and integral to the bonding material comprising natural or synthetic rubbers, thermo plastic elastomers, vinyls, plasticized vinyl, butyl rubber, styrene butadiene rubber, GSR, urethanes, and similar flexible transparent or translucent mediums with said materials throughout and integral to the structure. The structure maintains its reflective fluorescent capacity despite wear or abrasion and provides the reflective fluorescent capacity throughout its entire structure life.

Summary of Flow Effects

The flow of fluids has a great effect on the resulting appearance of the products made from the fluids. Most of our technology is aimed at the creation of uniform mixing which in turn creates uniform colors. To ensure uniform colors, the pigments usually used to form the color are also ground into the finest practical size so that the distribution of the particles can be so uniform and on such a microscopic scale that even with differing color pigments and clear matricies, the result is visual uniformity. The very fine pigments differ in use from the macro sized particles used in this invention. Macro particles in the sizes claimed also flow but, unlike micro particles, they are affected by the flow and unlike micro particles, they are notably visible in any resultant product. With these macroparticles, the flow will form patterns that can be made to swirl, drift or drip in a decorative manner. The macroparticles will cluster in some of the flow layers and within this invention where relatively low shear and high viscosity conditions create laminar flow these clusters will form patterns.

BRIEF DESCRIPTION OF THE DRAWINGS

In FIG. 1 the shapes are further shown, varying in size from macro to micro, are illustrated in cut-out 1 depicting a sampling of shapes, numbers 3, 4, 5, 6, 7, 8, 9, and 10, as partially representative of the types, shapes, character, and design of the fluorescent reflective safety particle chips.

DESCRIPTION OF THE PREFERRED EMBODIMENTS

Figure 1:
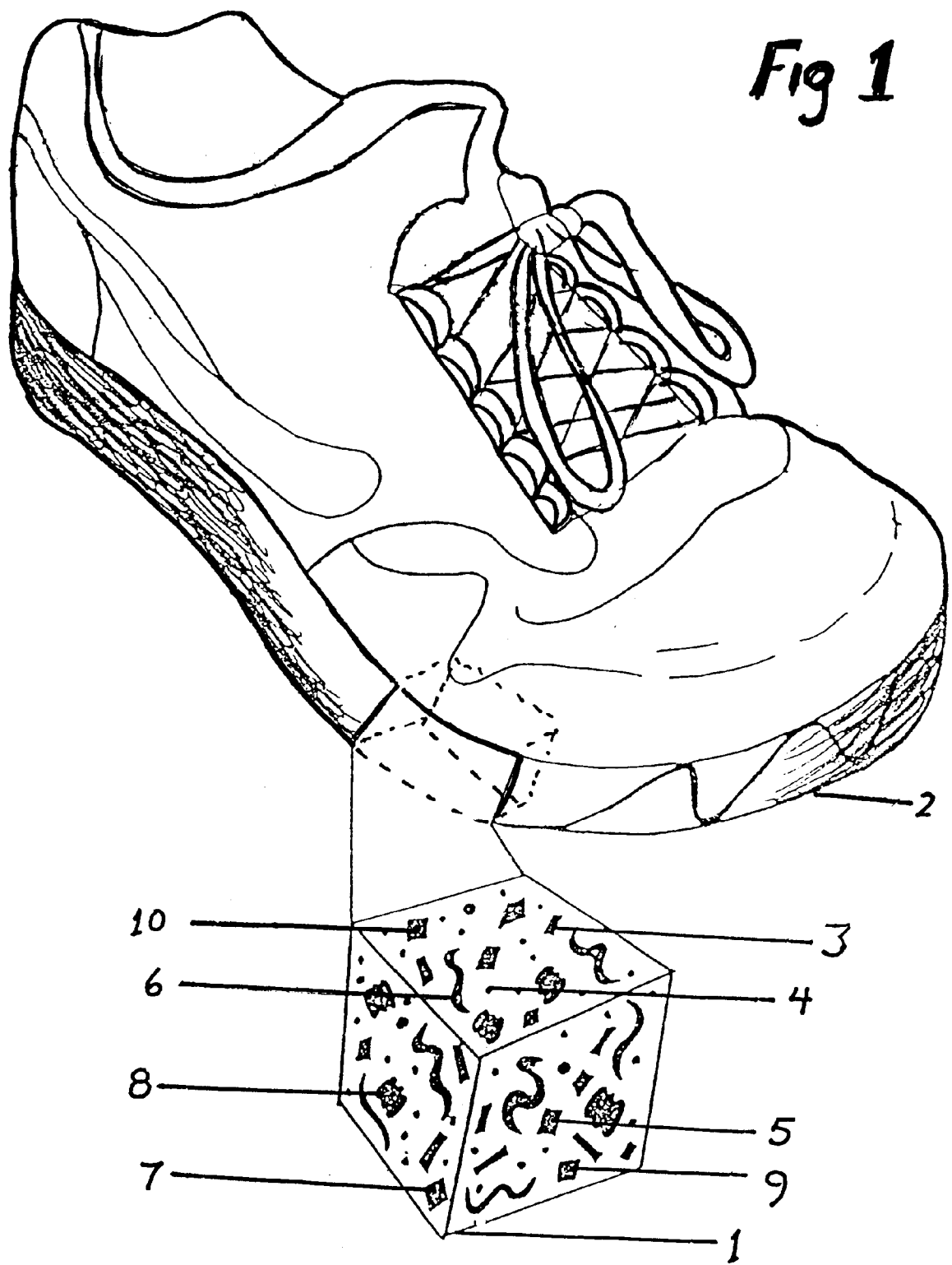
FIG. 1 is a cross-sectional, cut-away view, 1, of a typical walking shoe sole, 2, containing fluorescent reflective safety particle chips bonded or embedded in a pattern or at random therein, throughout and integral to the natural or synthetic rubbers, thermo plastic elastomers, vinyls, plasticized vinyl, butyl rubber, styrene butadiene rubber, GSR, urethanes and similar flexible transparent or translucent mediums with said materials throughout and integral to the structure to the surface, according to this invention.
Figure 2:
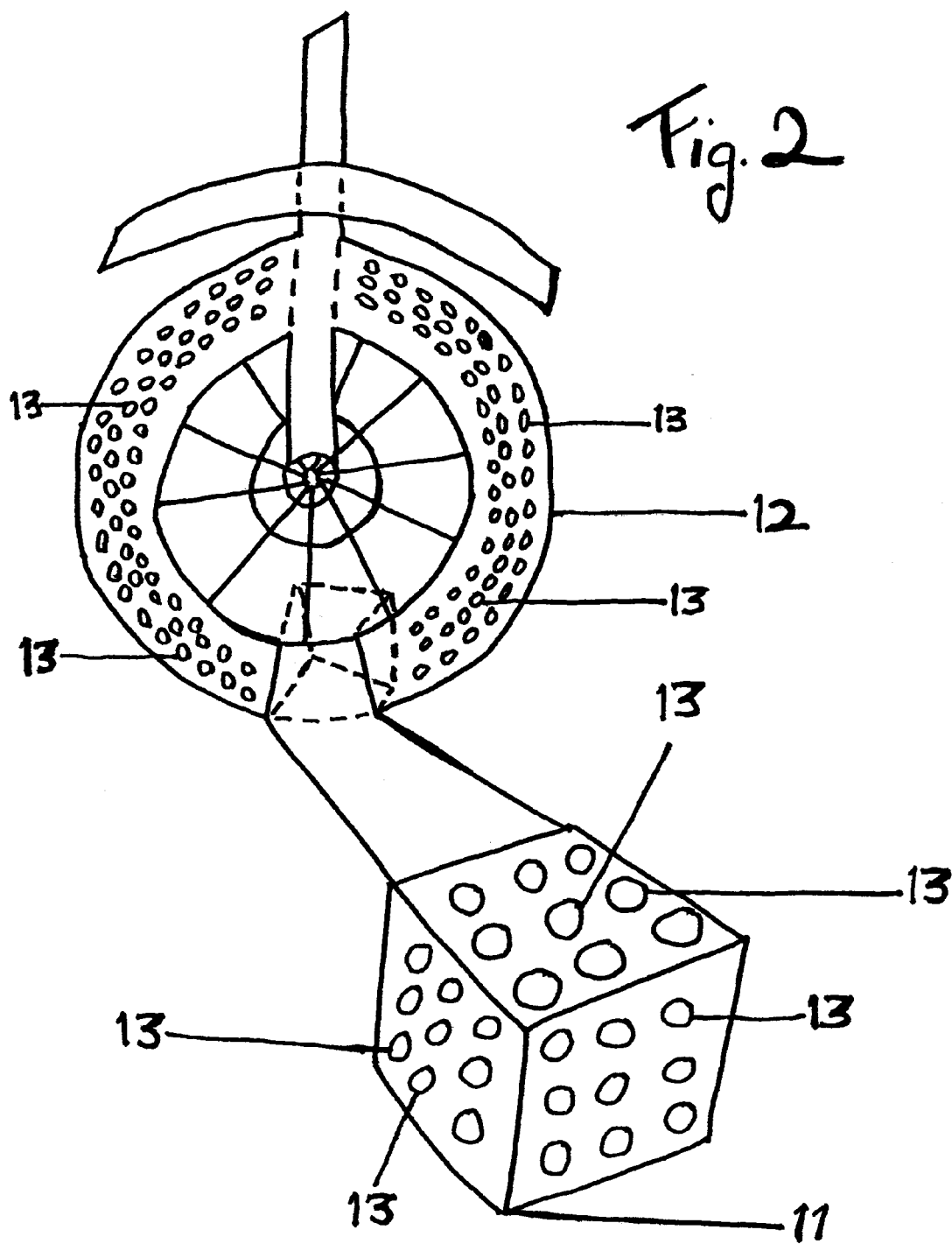
FIG. 2 is a cut-away, cross-sectional, three-dimensional view, 11, of the rubber structure that would make up a tire, 12, containing the reflective fluorescent safety particle chips, 13, embedded or bonded at random or in a pattern therein, throughout, and integral to the flexible, transparent or translucent medium being a natural or synthetic rubber, thermo plastic elastomers, vinyls, plasticized vinyl, butyl rubber, styrene butadiene rubber, GSR, urethanes and similar flexible transparent or translucent mediums with said materials throughout and integral to the structure to the surface, which structure extends to the surface according to this invention such as illustrated in FIG. 1.
Figure 3:
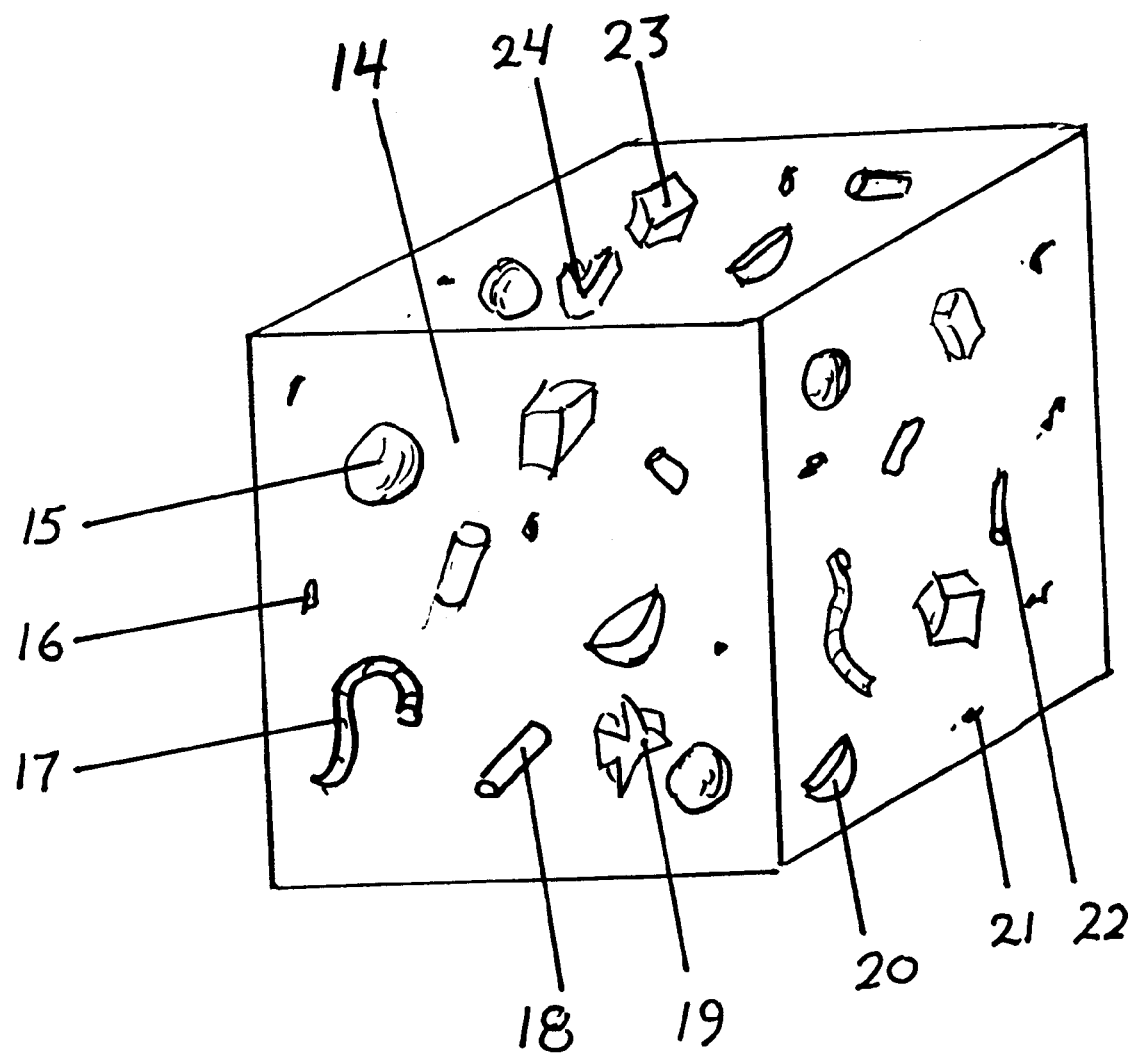
FIG. 3 is a detailed view of a typical cross-section, 14, of the flexible transparent or translucent medium as described in FIG. 1, containing reflective fluorescent safety particle chips bonded or embedded either in a pattern or at random within, throughout and integral to the structure to the surface according to this invention. The shapes and configurations vary from micro to macro and are shown as number 15, 16, 17, 18, 19, 20, 21, 22, 23 and 24, according to this invention.
Figure 4:
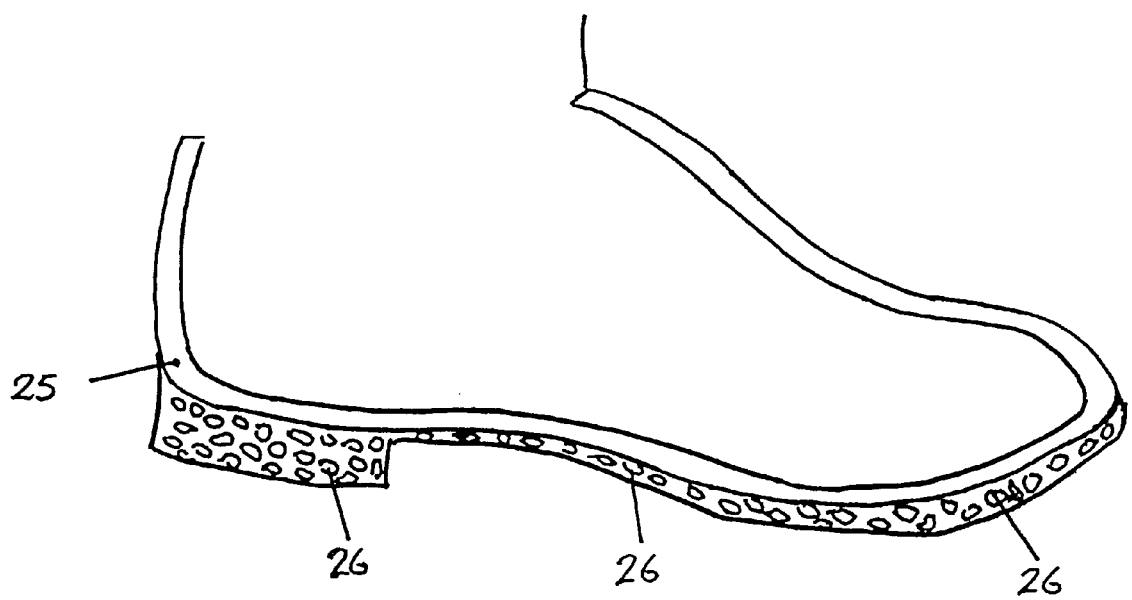
FIG. 4 is a cut-away, 25, cross-sectional view of the flexible transparent or translucent medium containing the fluorescent reflective safety particles or chips bonded or embedded throughout and integral thereto, 26, according to this invention and as are illustrated in FIG. 4.
Figure 5:
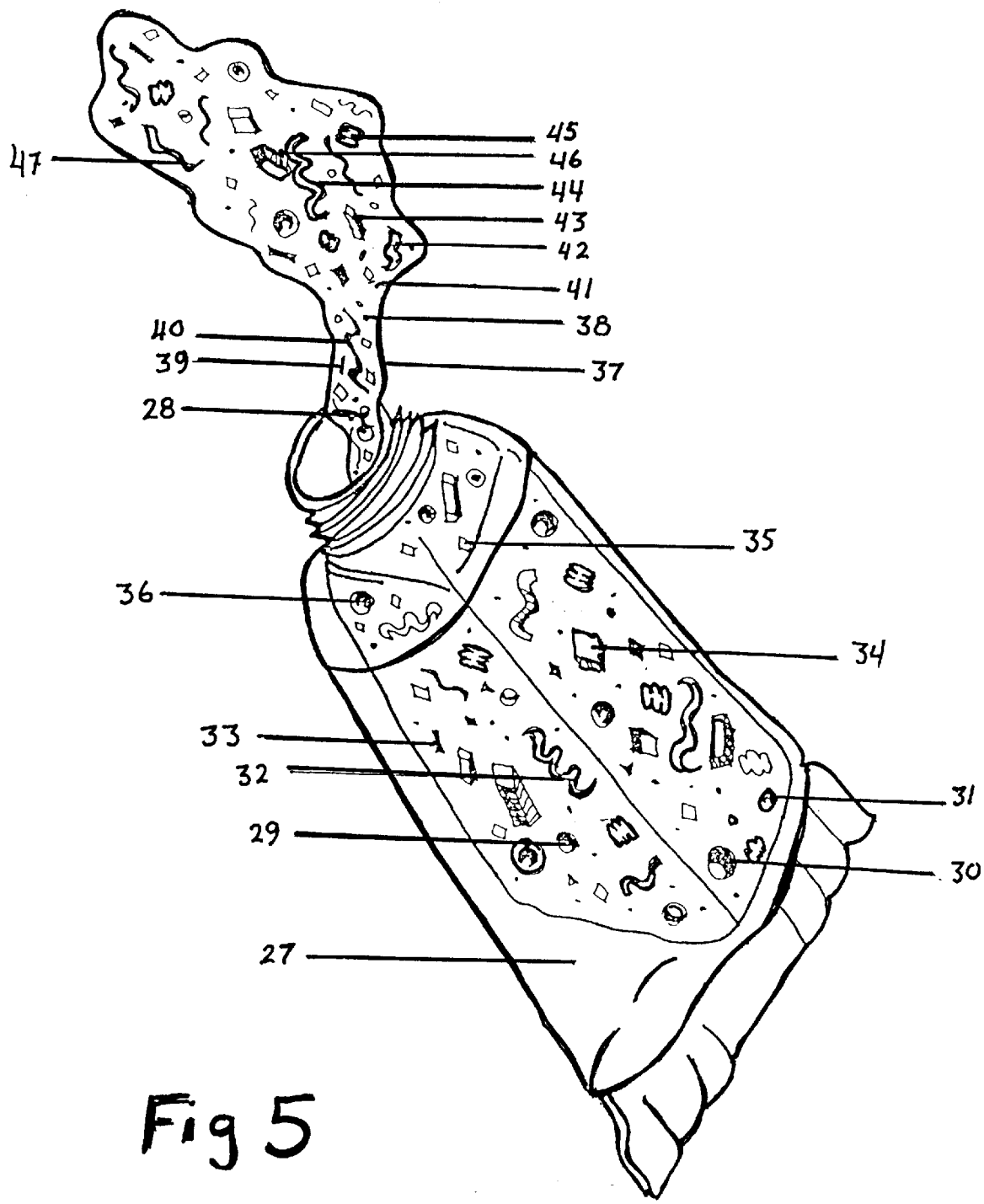
FIG. 5 is a broken-away, generally cross-sectional view of a tube, 27, containing an alternate embodiment of yet uncured medium material, 28, (being natural or synthetic rubbers, thermo plastic elastomers, vinyls, plasticized vinyl, butyl rubber, styrene butadiene rubber, GSR, urethanes, and similar flexible transparent or translucent mediums with said materials throughout and integral to the structure to the surface) material, 28, as represented within the tube container structure, 27, shown containing the motile material, 37, with different reflective fluorescent safety particles and chips, 30, 31, 32, 33, 34, 35, 36, 38, 39, 40, 41, 42, 43, 44, 45, 46, and 47, suspended at random within and throughout the motile (uncured) medium material to be used and/or applied according to this invention.

In one preferred method or system, the reflective fluorescent safety particles/chips embedded or bonded at random within, throughout and integral to natural or synthetic rubbers, thermo plastic elastomers, vinyls, plasticized vinyl, butyl rubber, styrene butadiene rubber, GSR, urethanes and similar flexible transparent or translucent mediums with said materials throughout and integral to the structure to the surface is generally designated as 26 in FIG. 4, included within the typical elongated cross-sectional view of a walking shoe sole, and although each item shown in the cross-sectional view in FIG. 4 is two-dimensional, when constructed in three-dimensional form, will have the effect of regular and random integration and co-mingling the placement more or less evenly distributed throughout the structure. Referring now to FIG. 2, shows the relative integration by random placement, 13, for use in an alternate structure to provide uniform reflective particle surface on all exterior sides so as to be visible reflectively by refraction of light from any view, 11. The structure according to this invention is particularly designed to provide constant reflective surface despite any wear patterns to the structure materials due to the reflective fluorescent particle or chip randomly integrated and co-mingled with the structure wherein same are bonded or embedded as shown in FIG. 3, the interspersing of the reflective fluorescent particles or chips 15, 16, 17, 18, 19, and 20, 21, 22, 23, and 24 on FIG. 3 demonstrates that distribution by random mixing within the structure will provide the reflective surface light refraction on all exposed surfaces, 14, whether as originally surfaced or worn surface and whether folded, stretched or twisted in any fashion. Although it is preferable in most cases to impregnate the natural or synthetic rubbers, thermo plastic elastomers, vinyls, plasticized vinyl, butyl rubber, styrene butadiene rubber, GSR, urethanes and similar flexible transparent or translucent mediums with said materials throughout and integral to the structure to the surface while motile, the same effect can be accomplished by embedding particles as shown in FIG. 1, particularly those shapes as described in the cross-sectional view FIG. 1, particle chips shown 3, 4, 5, 6, 7, 8, 9, and 10. The particular use of the reflective fluorescent safety particle chips, 30, 31, 32, 33, 34, 35, 36, 38, 39, 40, 41, 42, 43, 44, 45, 46, and 47, bonded at random within, throughout and integral to motile natural or synthetic rubbers, thermo plastic elastomers, vinyls, plasticized vinyl, butyl rubber, styrene butadiene rubber, GSR, urethanes and similar flexible transparent or translucent mediums with said materials throughout and integral to the structure to the surface provides particular applications for repairs of natural or synthetic rubbers, thermo plastic elastomers, vinyls, plasticized vinyl, butyl rubber, styrene butadiene rubber, GSR, urethanes and similar flexible transparent or translucent mediums with said materials throughout and integral to the structure to the surfaces where it is desirable to have reflective/by refracted light surfaces as shown in the broken-away, cross-sectional view of a tube, 27, of such uncured structure material, 28, which is interspersed by folding the material together like cookie batter depicted in FIG. 5. In order to most advantageously take advantage of this structure, same may be incorporated within footwear, and particularly the soles of the footwear where it is desirable that the surface be waterproof and yet conform to irregular or particular shapes to accomplish special purpose tasks and the use of this structure may be applied to injection moulding, pre-formed surfaces or may be cut from a larger piece of the structure without affecting the safety valve imparted by the reflective fluorescent safety particle chips embedded or bonded therein at random within, throughout and integral to natural or synthetic rubbers, thermo plastic elastomers, vinyls, plasticized vinyl, butyl rubber, styrene butadiene rubber, GSR, urethanes and similar flexible transparent or translucent mediums with said materials throughout and integral to the structure to the surface.

Typically the principal or preferred structure of this embodiment and system can be accomplished by obtaining fluorescent materials cut, manufactured, and/or prepared in particular sizes and shapes consistent with those described within this disclosure and the fluorescent reflective particle chips may be cloth, fabric, plastic pigment, or any material that reacts to a wide spectrum of light that results in the fluorescing of the material to provide an increase of the total available visible light by refraction and reflection of the fluorescing aspects of the reflective fluorescent particles and/or chips. Once a particular selection of fluorescent reflective particle chips has been chosen, it is then mixed with a natural or synthetic rubber, thermo plastic elastomers, vinyls, plasticized vinyl, butyl rubber, styrene butadiene rubber, GSR, urethanes and similar flexible transparent or translucent mediums with said materials throughout and integral to the structure to the surface such as the GOOP line of adhesives/sealants. The class of polyester/silicone base materials such as BOAT LIFE MARINE SEALANT, GOOP, AND GE SILICONE II CLEAR SILICONE which is made under U.S. Pat. Nos. 4,41042 and 4,483,23 are especially effective. By combining any of these polyester/silicone materials with the fluorescent reflective particle-chips as if in a cookie batter and then permitting the mixture to dry in a mold form such as a cut-away portion of a tennis shoe sole with sufficient volume to fill the void will make the resin cure to a flexible transparent-translucent medium with reflective fluorescent safety particle chips bonded therein at random.

The above is simply one recipe for producing the described invention which may be modified by substituting different mediums with the same or different reflective fluorescent particle chips depending upon the desired use, including the use in bicycle tires or materials made through injection moulding where the abrading of the surface does not denigrate the reflective fluorescent quality of this structure but indeed enhances same. The shape and character of the fluorescent reflective safety particle chips should be adapted to the particular application such as shaping them as dots, elongations, spirals, squares, blocks, balls, letters, numbers, or any other form practical or decorative so that they may be used in a random mix or in a specific design to insure that their decorative appearance results in their increased functional usefulness. By use of different materials and combining different shapes of the reflective fluorescent safety particle chips the usefulness of this invention will greatly exceed the parameters of the description of the preferred embodiments by other embodiments of solid or inset design, all of which are accomplished from the materials set forth in this disclosure. Particle size will be related to material density or desired material elasticity or flexibility so as not to denigrate from the structural integrity of the embodiment.

In a second embodiment, a 24% vinyl acetate content ethylene vinyl acetate copolymer (EVA) is melted in an extruder and this extruder is supplied with a vent port into which reflective fluorescent particles and shapes of a thermoplastic that has a melting point higher than the EVA resin such as a high density polyethylene or a nylon resin are added at this vent port location and the particles and shapes are wetted by the final part of the extruder screw prior to extrusion or injection of the melted polymers or resins.

In a third embodiment the fluorescent or colored shapes and particles form a system when added to a polyester based thermoset resin or to a polyurethane resin and mixed prior to pouring or injecting into molds.

The embodiments as described herein within this invention are illustrative of some of the desired applications of the principles of the present invention. Numerous modifications may be made by those skilled in the art after the disclosure of the principles of this present invention without departing from the true spirit and the actual scope of this invention as revealed herein. The spirit and scope of the underlying inventive concept is not limited to the particular forms herein shown and described, except insofar as indicated by the scope of the appended claims.

We claim:

1. An article of footwear having enhanced safety and visibility comprising a matrix of transparent or translucent thermoplastic elastomeric or plastic materials and a series of higher melting point or different material shaped polymeric parts which are lumps or chips having a size of more than ¹⁄₃₂nd inch in the smallest dimension and less than ³⁄₈ inch in the largest dimension, said shaped polymeric parts contain a pigment or dye that is fluorescent, where said shaped polymeric parts, lumps or chips are incorporated and distributed within the said matrix of transparent or translucent thermoplastic elastomeric or plastic materials by extrusion or injection molding process.

2. The material in claim 1 where the said article is a shoe sole or shoe sole extension, rib, side wall, outer or surface component of footwear.

3. The material of claim 1 wherein said series of shaped parts comprise a multitude of different shapes.

4. The material of claim 1 where said matrix of transparent or translucent material is a plastic material which is a curable liquid thermosetting resin, and where said series of shaped parts are mixed and wetted by and into said curable liquid thermosetting resin and the liquid thermosetting resin reacts with a curing agent to form said thermosetting resin matrix.

5. The material of claim 1 wherein the transparent or translucent thermoplastic elastomeric or plastic material is a thermoplastic material of lower melting point than said series of shaped polymeric parts and wherein said series of shaped polymeric parts are blended into said matrix of transparent or translucent material at the feed point in a plasticizing extruder.

6. The material of claim 1 where said matrix of transparent or translucent material is a thermoplastic and said series of shaped polymeric parts are mixed or compounded with the thermoplastic in a melt mixer.

7. A material for soles of shoes, shoe sole extensions, footwear article, or other externally visible footwear component comprising a polymeric matrix and discrete shaped polymeric parts mixed together by extrusion or injection molding, said polymeric matrix is a material selected from natural or synthetic rubbers, thermoplastic elastomers, polyvinylchloride, plasticized polyvinylchloride, butyl rubber, styrene butadiene rubber, urethane or other transparent or translucent elastomeric polymer medium; and said discrete shaped polymeric parts are lumps or chips which: (1) have a size of more than ¹⁄₃₂ inch in the smallest dimension and less than ³⁄₈ inch in the largest dimension, (2) contain pigments or dyes that are fluorescent, and (3) are of a material which has a higher melting point than said polymeric matrix or which is dissimilar to material of said matrix.

8. The material of claim 7 where said matrix of transparent or translucent material is an elastomeric polymer into which said discrete shaped polymeric parts have been mixed.

9. The materials of claim 8 wherein said elastomeric polymer is a thermosetting elastomer consisting of polyurethane, silicone rubber, or polyester and said shaped polymeric parts are molded thermoset or molded thermoplastic materials.

10. The materials in claim 8 where said discrete shaped polymeric parts are a multitude of differing shapes and colors.

11. The material of claim 7 where said matrix of transparent or translucent material is a thermoplastic elastomer and said shaped polymeric parts are of a thermoplastic material with a melting temperature that is at least 25° F. higher than the melting temperature of said thermoplastic elastomer matrix.

12. The materials in claim 11 where said discrete shaped parts are a multitude of differing shapes and colors.

13. A material for use in the manufacture of shoe soles, shoe sole extensions, articles of footwear, externally visible safety or footwear components comprising a matrix of transparent or translucent polymer or elastomer and shaped polymeric parts which are lumps or chips; said shaped polymeric parts:
(1) are of higher melting point or are of dissimilar material than the matrix of transparent or translucent polymer, (2) have a size of more than ¹⁄₃₂ inch in the smallest dimension and less than ³⁄₈ inch in the largest dimension, and (3) contain fluorescent pigments or dyes;

wherein said shaped polymeric parts are distributed by extrusion or injection molding within said matrix of transparent or translucent polymer or elastomer.

14. The material of claim 13 where said matrix is a thermosetting material.

15. The material of claim 13 where said matrix is a thermoplastic material.

16. The material of claim 13 where said shaped polymeric parts are engineering plastics.

17. The material of claim 16 where said shaped polymeric parts have a softening point above the processing point of said matrix.

18. A material for footwear, footwear parts, shoe soles or extensions of shoe soles comprising
a transparent or translucent polymer as a base material and a multitude of shaped polymeric parts added to said transparent or translucent polymer base material;
said multitude of shaped polymeric parts is in the form of lumps or chips which: (1) are of higher melting point or dissimilar material than the said transparent or translucent polymer base material, (2) have a size of more than ¹⁄₃₂ inch in the smallest dimension and less than ³⁄₈ inch in the largest dimension, and (3) contain fluorescent pigments or dyes, and which are distributed throughout said transparent or translucent polymer base material by extrusion or injection molding.

19. A material for safety clothing, footwear, footwear parts, or other externally visible components comprising a polymeric matrix and reflective or fluorescent safety polymeric particles, said polymeric matrix is a material selected from natural or synthetic rubbers, thermoplastic elastomers, polyvinylchloride, plasticized polyvinylchloride, butyl rubber, styrene butadiene rubber, urethane or other transparent or translucent elastomeric polymer medium; and said reflective or fluorescent safety polymeric particles are particles, lumps, pieces, shapes or chips which: (1) have a size of more than ¹⁄₃₂ inch in the smallest dimension and less than ³⁄₈ inch in the largest dimension, (2) contain pigments or dyes that are fluorescent, and (3) are of a material which has a higher melting point than said polymeric matrix or which is dissimilar to material of said matrix thus permitting the exterior of said polymeric particles to soften; wherein said polymeric particles do not become a dispersion; and wherein said polymeric matrix and said reflective or fluorescent safety polymeric particles are embedded, bonded or mixed together and distributed in a pattern or at random throughout and integral to said polymeric matrix by extrusion or injection molding.

20. A composition of material for making shoe soles where a number of parts, lumps or chips having a size more than ¹⁄₃₂ of an inch in the smallest dimension and less than ³⁄₈ of an inch in the largest dimension and which parts, lumps or chips contain a fluorescent pigment or dye are distributed within a matrix of transparent or translucent polymers which have a processing temperature at least 25° F. lower than the melting point of said parts, lumps or chips and where said parts, lumps or chips are distributed within the matrix of transparent or translucent polymers by screw extrusion or injection molding processes.

21. A method for the manufacture of fashion and safety accessories, decorative parts, clothing, shoes, shoe soles, shoe sole extensions, shoe sole parts comprising:

(1) molding discrete shaped polymeric pieces which are lumps or chips having a size of more than 1/32 inch in the smallest dimension and less than 3/8 inch in the largest dimension that contain a pigment or dye that is fluorescent;

(2) including these molded discrete shaped polymeric pieces within a basic matrix of transparent or translucent thermoplastic polymer or elastomer material, said molded discrete shaped polymeric pieces which are lumps or chips having a melting point that is at least 25° F. higher than said basic matrix of transparent or translucent thermoplastic polymer or elastomer material;

(3) and mixing said molded discrete shaped polymeric pieces which are lumps or chips with said matrix of transparent or translucent thermoplastic polymer or elastomer material so that said discrete shaped polymeric pieces can be added into the feed of conventional shear mixing plastic extrusion equipment to produce said fashion and safety accessories, decorative parts, clothing, shoes, shoe soles, shoe sole extensions, shoe sole parts in which discrete fluorescent areas are visible within said basic matrix of transparent or translucent thermoplastic or elastomer material.

22. The method of manufacturing as claimed in claim 21 where said matrix of transparent or translucent thermoplastic material is a plasticized polyvinylchloride molding compound.

23. The method of manufacturing as claimed in claim 21 where said matrix of transparent or translucent thermoplastic material is an ethylene vinyl acetate or an ethylene methyl acrylate copolymer material.

24. The method of manufacturing as claimed in claim 21 where said matrix of transparent or translucent thermoplastic material is a polyolefin polymer.

25. The method of manufacturing as claimed in claim 21 where the matrix consists of a styrene butadiene rubber, a ethylene propylene rubber, a butyl rubber, or a chlorobutyl rubber.

26. The method of manufacturing as claimed in claim 21 where said molded shaped pieces are molded from an engineering plastic.

27. A method for the manufacture of material used in the manufacture of shoe soles, shoe sole extensions, articles of footwear, footwear parts, externally visible safety or footwear components comprising:

(1) mixing and blending within a base matrix of moldable translucent or transparent polymeric or elastomeric materials, prior to injection or extrusion molding, discrete shaped polymeric parts, which are lumps or chips, said discrete shaped polymeric parts: (1) being molded from higher melting point or dissimilar moldable translucent or transparent materials than said base matrix of moldable translucent or transparent materials, (2) having a size of more than 1/32 inch in the smallest dimension and less than 3/8 inch in the largest dimension, and (3) containing fluorescent pigments or dyes; and (2) distributing said discrete shaped polymeric parts within said base matrix of moldable translucent or transparent materials by extrusion or injection molding process.

28. The method of claim 27 where said translucent or transparent materials are silicone, polyester, or urethane polymeric materials.

29. A method of making articles of footwear having enhanced safety and visibility comprising: (1) incorporating and distributing by an extrusion or injection molding process, within a matrix of transparent or translucent thermoplastic elastomeric or plastic material, a series of shaped polymeric parts having higher melting point than or different material from said transparent or translucent material; wherein said shaped polymeric parts are lumps or chips having a size of more than 1/32nd inch in the smallest dimension and less than 3/8 inch in the largest dimension and containing a pigment or dye that is fluorescent.

30. A method of making shoe soles, shoe sole extensions, having enhanced safety and visibility comprising:

(1) incorporating and distributing by an extrusion or injection molding process, within a base matrix of transparent or translucent elastomeric polymer mediums, fluorescent safety polymeric parts of higher melting point or dissimilar material than said base matrix, where said base matrix is a material selected from natural or synthetic rubbers, thermoplastic elastomers, polyvinylchlorides, plasticized polyvinylchloride, butyl rubber, styrene butadiene rubber, urethanes and other transparent or translucent elastomeric polymer mediums, and where said fluorescent safety polymeric parts are (1) particles, chips, pieces, lumps and or shapes which have a size of more than 1/32 inch in the smallest dimension and less than 3/8 inch in the largest dimension, and (2) contain reflective fluorescent pigments or dyes.

31. A method for manufacturing articles of safety polymeric material having enhanced safety and visibility comprising:

(1) incorporating by an extrusion or injection molding process within a base matrix of natural or synthetic rubber, thermo plastic elastomer, polyvinylchloride, plasticized polyvinylchloride, butyl rubber, styrene butadiene rubber, urethane and other transparent or translucent thermoplastic elastomeric polymer medium, discrete shaped polymeric parts of higher melting point or dissimilar material than said base matrix; wherein said discrete shaped polymeric parts are (1) chips, shapes or lumps (2) have a size of more than 1/32 inch in the smallest dimension and less than 3/8 inch in the largest dimension and (3) contain or encapsulate fluorescent pigment or materials containing fluorescent pigments or dyes; and (2) distributing by an extrusion or injection molding process, a bulk dispersion of said discrete shaped polymeric parts in and within and throughout all or part of said base matrix, resulting in a product of safety polymeric material containing said discrete shaped polymeric parts, being affixed within the said base matrix by embedment.

32. A method for the use of thermoplastic injection equipment employing extrusion or injection molding methods comprising: applying said therioplastic injection equipment employing extrusion or injection molding methods to process a transparent or translucent polymer matrix, together with shaped pieces of dissimilar polymeric materials, said shaped pieces having higher melting point than that of said polymer matrix, wherein said shaped pieces of dissimilar polymeric materials are shaped parts, lumps or chips, have a size of more than 1/32 inch in the smallest dimension and less than 3/8 inch in the largest dimension; and wherein said shaped pieces of dissimilar polymeric materials soften rather than disperse thereby creating within said matrix of transparent or translucent polymer an extruded matrix of material with the said higher melting shaped pieces therein.

* * * * *